(12) United States Patent
Bechtel et al.

(10) Patent No.: US 12,539,146 B2
(45) Date of Patent: Feb. 3, 2026

(54) SPINAL FIXATION SYSTEM AND METHOD

(71) Applicant: GLOBUS MEDICAL, INC., Audubon, PA (US)

(72) Inventors: Matthew Bechtel, Philadelphia, PA (US); Caelan Allen, Philadelphia, PA (US)

(73) Assignee: Globus Medical, Inc., Audubon, PA (US)

( * ) Notice: Subject to any disclaimer, the term of this patent is extended or adjusted under 35 U.S.C. 154(b) by 821 days.

(21) Appl. No.: 17/840,746

(22) Filed: Jun. 15, 2022

(65) Prior Publication Data

US 2023/0022448 A1 Jan. 26, 2023

Related U.S. Application Data

(63) Continuation-in-part of application No. 17/382,782, filed on Jul. 22, 2021, now Pat. No. 11,439,444.

(51) Int. Cl.
A61B 17/70 (2006.01)

(52) U.S. Cl.
CPC .................. A61B 17/7034 (2013.01)

(58) Field of Classification Search
CPC .................. A61B 17/7083; A61B 17/7085
See application file for complete search history.

(56) References Cited

U.S. PATENT DOCUMENTS

| | | | |
|---|---|---|---|
| 7,179,261 B2 | 2/2007 | Sicvol et al. | |
| 7,250,052 B2 | 7/2007 | Landry et al. | |
| 7,476,240 B2 | 1/2009 | Raymond et al. | |
| 7,491,218 B2 | 2/2009 | Landry et al. | |
| 7,527,638 B2 | 5/2009 | Anderson et al. | |
| 7,621,918 B2 | 11/2009 | Jackson | |
| 7,666,188 B2 | 2/2010 | Anderson et al. | |
| 7,854,751 B2 | 12/2010 | Sicvol et al. | |
| 7,914,558 B2 | 3/2011 | Landry et al. | |
| 8,172,847 B2 | 5/2012 | Dziedzic et al. | |
| 8,317,796 B2 | 11/2012 | Stihl et al. | |
| 8,439,922 B1 | 5/2013 | Arnold et al. | |
| 8,518,082 B2 | 8/2013 | Sicvol et al. | |
| 8,579,943 B2 | 11/2013 | Nichols et al. | |
| 8,591,515 B2 | 11/2013 | Jackson | |
| 8,603,094 B2 | 12/2013 | Walker et al. | |
| 8,617,210 B2 | 12/2013 | Sicvol et al. | |
| 8,986,349 B1 | 3/2015 | German et al. | |
| 9,192,415 B1 | 11/2015 | Arnold et al. | |
| 9,198,698 B1 | 12/2015 | Doose et al. | |
| 9,220,543 B2 | 12/2015 | Walker et al. | |

(Continued)

Primary Examiner — Ellen C Hammond

(57) ABSTRACT

In an example system, a screw tower includes a rigid screw tower body with flexible tulip retaining clips for releasably securing the screw tower to a tulip. An elongate rod channel receives a spinal fixation rod transversely through the screw tower body. A drive shaft rotatably received in the screw tower body includes opposing first and second threaded members for threadedly engaging an outwardly threaded portion of a drive shaft. Each threaded member rides on a corresponding ramped portion on the driver body to guide the threaded members proximately and radially inwardly to an engaged position with the threaded portion of the drive shaft and distally and radially outwardly to a disengaged position from the threaded portion of the drive shaft.

6 Claims, 7 Drawing Sheets

(56) References Cited

U.S. PATENT DOCUMENTS

| | | | |
|---|---|---|---|
| 9,439,699 B2 | 9/2016 | Sicvol et al. |
| 9,486,256 B1 | 11/2016 | Lish et al. |
| 9,492,208 B1 | 11/2016 | Arnold et al. |
| 9,492,209 B2 | 11/2016 | Biedermann et al. |
| 9,517,099 B2 | 12/2016 | Bess et al. |
| 9,744,050 B1 | 8/2017 | Reitblat et al. |
| 9,956,012 B2 | 5/2018 | Biedermann et al. |
| 10,039,577 B2 | 8/2018 | Jackson |
| 10,064,662 B2 | 9/2018 | Gunn et al. |
| 10,085,778 B2 | 10/2018 | Semingson et al. |
| 10,136,927 B1 | 11/2018 | Lish et al. |
| 10,159,579 B1 | 12/2018 | Reitblat et al. |
| 10,299,839 B2 | 5/2019 | Sicvol et al. |
| 10,368,923 B2 | 8/2019 | Altarac et al. |
| 10,398,481 B2 | 9/2019 | Goel et al. |
| 10,456,173 B1 | 10/2019 | Casey et al. |
| 10,499,959 B2 | 12/2019 | Heuer et al. |
| 10,610,296 B2 | 4/2020 | Mickiewicz et al. |
| 10,702,315 B2 | 7/2020 | Lindner |
| 10,716,602 B2 | 7/2020 | Fischer |
| 10,751,095 B2 | 8/2020 | Jackson |
| 10,893,895 B2 | 1/2021 | Gunn et al. |
| 10,898,241 B2 | 1/2021 | Lish et al. |
| 10,918,424 B2 | 2/2021 | Stoll et al. |
| 11,051,861 B2 | 7/2021 | Morris |
| 11,197,697 B2 | 12/2021 | Goel et al. |
| 11,376,047 B2 | 7/2022 | Jung |
| 2020/0069340 A1 | 3/2020 | Sicvol et al. |
| 2020/0205864 A1 | 7/2020 | Mickiewicz et al. |
| 2021/0059725 A1 | 3/2021 | Avidano et al. |
| 2021/0161568 A1 | 6/2021 | Stoll et al. |
| 2021/0186566 A1 | 6/2021 | Gunn et al. |
| 2021/0282820 A1 | 9/2021 | Morris |
| 2021/0346066 A1* | 11/2021 | Jung ................ A61B 17/7086 |
| 2022/0061896 A1 | 3/2022 | Goel et al. |

* cited by examiner

SPINAL FIXATION SYSTEM AND METHOD

CROSS-REFERENCE TO RELATED APPLICATION(S)

This application is a continuation-in-part application of U.S. patent application Ser. No. 17/382,782 filed on Jul. 22, 2021, the contents of which are incorporated by reference herein in its entirety for all purposes.

BACKGROUND

During spinal surgery, fixation devices may be anchored to specific portions of the spine. The fixation devices may then be leveraged to manipulate the spine using various instruments. Many spinal fixation systems in current use are effective for their purposes. However, as with other surgical procedures and equipment, there are ongoing efforts to continually refine these systems and methods. Further improvements to performance criteria such as reliability, ease of use, precision, and the ability to make quick connections may help minimize the overall time and cost and maximize patient outcomes.

BRIEF DESCRIPTION OF THE DRAWINGS

These drawings illustrate certain aspects of some of the embodiments of the present invention and should not be used to limit or define the invention.

DETAILED DESCRIPTION

The present disclosure provides a spinal fixation system, apparatus, and method for use in minimally invasive spinal surgery (MIS) or open wound spinal surgery. Such procedures generally entail anchoring to selected spinal structures, such as vertebrae, so that those spinal structures can be manipulated such as to correct or improve their relative positions. Examples described herein include a screw tower that can be anchored to a spinal structure with a tulip and pedicle screw. The screw tower includes an elongate rod channel extending axially between opposing walls. The screw tower may be used to urge one or more members axially into engagement with the tulip with a drive shaft rotatably received in a screw tower body. For example, the drive shaft may be used to apply a torque to a locking cap to secure the locking cap to the tulip over a screw head of the pedicle screw. A spinal fixation rod may then be received transversely through the rod channel and the drive shaft may be used to seat the spinal fixation rod in the tulip during rod reduction. While the examples described herein are described with respect to pedicle screws, one of ordinary skill in the art would understand and appreciate that the example systems and methods may be used with other types of fastening mechanisms.

Figure 1:
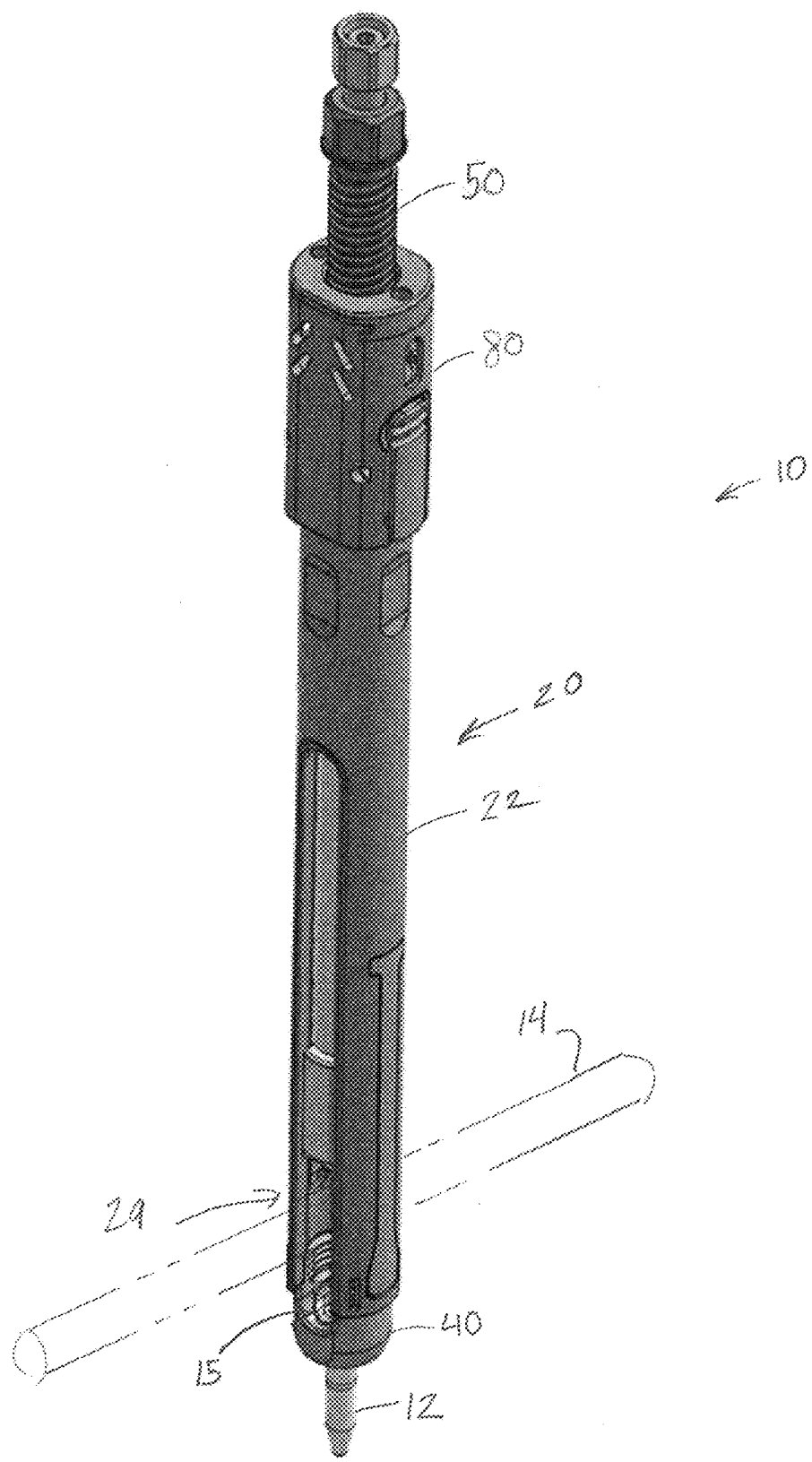
FIG. 1 is a perspective view of one example configuration of a system for performing a spinal fixation procedure.

FIG. 1 is a perspective view of one example configuration of a system 10 for performing a spinal fixation procedure. The main components of the system 10 include a screw tower 20, a drive shaft assembly 50 extending internally to the screw tower 20, and a driver 80 for driving the drive shaft assembly 50. The screw tower 20 is shown releasably coupled to a pedicle screw 12 and tulip 40. The screw tower 20 includes a screw tower body 22 with an elongate rod channel 29 for receiving a spinal fixation member, such as a spinal fixation rod 14 extending transversely through the screw tower body 22. The driver 80 is coupled to the drive shaft assembly 50 to operate the drive shaft assembly 50. The drive shaft assembly 50 is used to drive various members toward the pedicle screw, or specifically into engagement with the tulip 40. For example, the drive shaft assembly 50 may include a locking cap driver (e.g., hex, torx, screwdriver, or other type of driver or attachment) to secure a tulip locking cap to the tulip 40 over a screw head 15 of the pedicle screw 12. The drive shaft assembly 50 may then be used to seat the spinal fixation rod 14 into the tulip 40, generally referred to as rod reduction. These system components will be discussed in greater detail in the context of subsequent figures.

Figure 2:
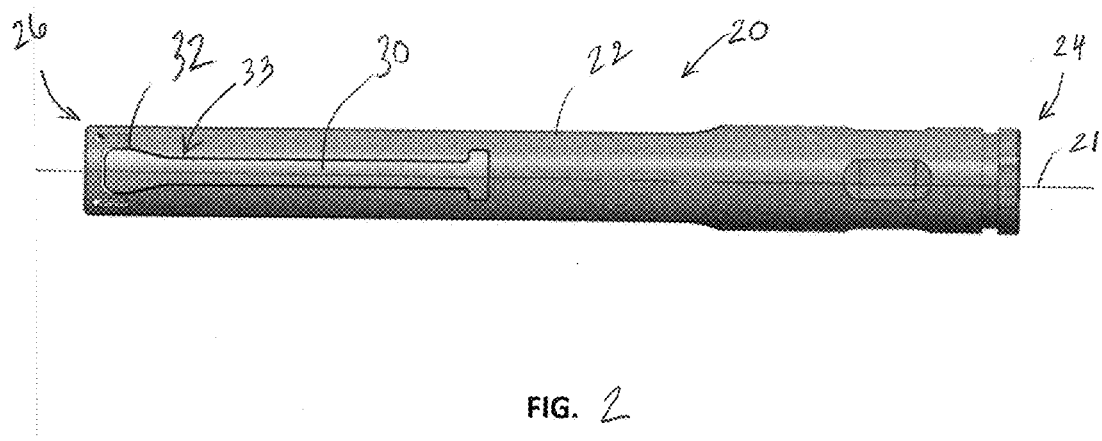
FIG. 2 is a first side view of the screw tower for a spinal fixation procedure according to the example configuration of FIG. 1

FIG. 2 is a first side view of the screw tower 20 for a spinal fixation procedure according to the example configuration of FIG. 1. The screw tower 20 includes a screw tower body 22 that defines a central axis 21. The screw tower body 22 includes a generally tubular proximal end 24 and a distal end 26 for receiving a tulip and securing the screw tower body 22 thereto. Generally, a screw tower 20 according to this disclosure may have a rigid screw tower body 22 so that the rigid screw tower body supports loading with no appreciable flexing of the rigid screw tower body during use. The screw tower 20 has one or more flexible tulip retaining clips 30 coupled to the rigid screw tower body for securing the screw tower 20 to an anchor such as a tulip. The tulip retaining clips 30 may be separately formed and then coupled to the rigid screw tower body 22. Embodiments having more than one retaining clip 30 may have the retaining clips circumferentially spaced about the central axis 21. This example specifically includes two retaining clips 30 opposite one another, i.e., 180 degrees apart. The retaining clips 30 may each be coupled to the screw tower body 22 in a cantilevered configuration. Each retaining clip 30 has a free end 32 adjacent the distal end 26 of the screw tower body 22. The screw tower body 22 includes a corresponding aperture 33 to receive each retaining clip 30 and which a portion of the retaining clip 30 may protrude through. Each aperture 33 may have a shape that closely conforms to the shape of the respective retaining clip 30. A portion (e.g., the free end 32) may protrude slightly radially into the screw tower body 22. Each tulip retaining clip 30 is radially flexible to move the free end 32 radially (e.g., outwardly) in response to receiving a tulip. As will be further discussed below, each tulip retaining clip 30 also includes a retention feature at the free end 32 for retaining the received tulip.

Figure 3:
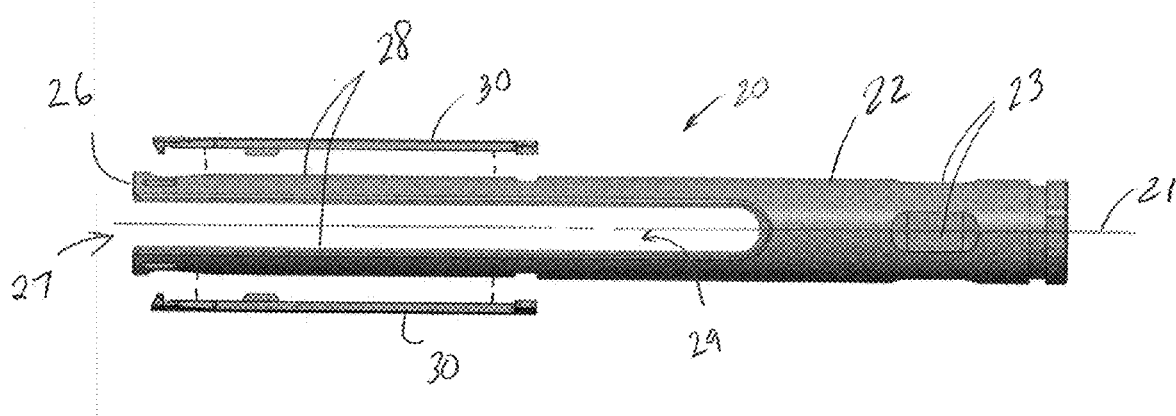
FIG. 3 is a second side view of the screw tower rotated ninety degrees about the central axis from its position in FIG. 2.

FIG. 3 is a second side view of the screw tower 20 rotated ninety degrees about the central axis 21 from its position in FIG. 2. The pair of opposing tulip retaining clips 30 are shown in a partially exploded view, as they may be formed separately and then coupled to the rigid screw tower body 22. A distal opening 27 is formed at the distal end 26 of the screw tower body 22. The distal opening 27 is sized for receiving a tulip. The screw tower body 22 includes opposing first and second rigid, axially-extending walls 28 that define an elongate rod channel 29 therebetween. The elongate rod channel 29 is sized for receiving a spinal fixation rod (e.g., see fixation rod 14 in FIG. 1) to extend transversely through the screw tower body 22 between the first and second walls 28. The screw tower body 22 also includes a plurality of circumferentially spaced flat sections 23 along the tubular proximal end 26 of the screw tower body 22 for receiving a counter-torque instrument (e.g., a wrench).

Figure 4:
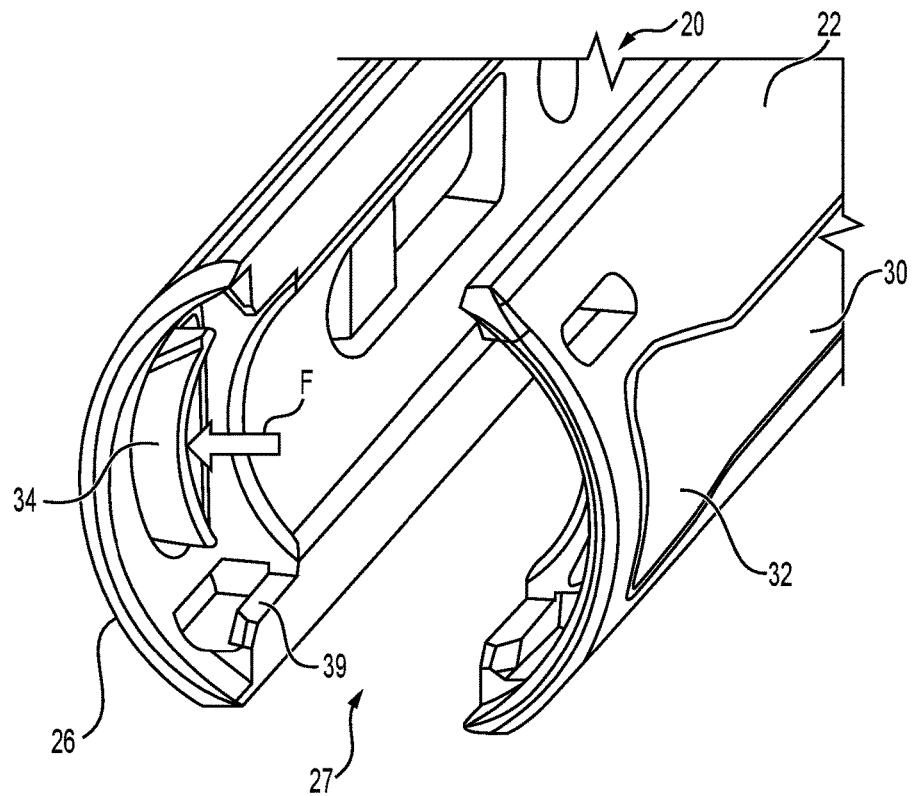
FIG. 4 is an enlarged, perspective view of the distal end of the screw tower.

FIG. 4 is an enlarged, perspective view of the distal end 26 of the screw tower 20. The free ends 32 of the tulip retaining clips 30 protrude slightly into the screw tower body 22. A retention member 34 may be formed on each free end 32 for engaging a tulip (or other anchoring member in other embodiments). The free ends 32 may be urged radially outwardly in the direction of the force arrow "F" by flexing the tulip retaining clips 30 in response to engagement by the tulip or other anchoring member. The free ends 32 may then snap back into place in engagement with the tulip or other anchoring member. Anti-rotation and anti-splay features 39 are provided on the distal end 26 of the screw tower body 22 with one or more corresponding anti-rotation and anti-splay features to be provided on the tulip.

Figure 5:
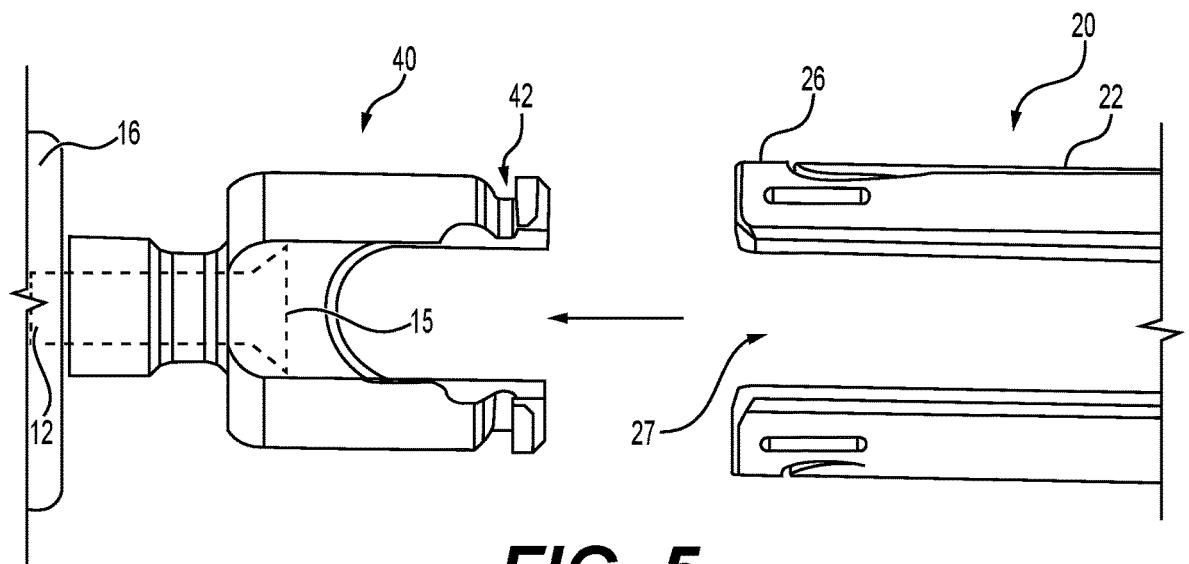
FIG. 5 is a side view of the distal end of the screw tower body juxtaposed with a tulip according to an example configuration.

FIG. 5 is a side view of the distal end 26 of the screw tower body 22 juxtaposed with a tulip 40 according to an example configuration. Anti-rotation and anti-splay features on the tulip 40 are respectively engaged with the anti-rotation and anti-splay features 39 on the screw tower body 22 (FIG. 4) in response to receiving the tulip 40 into the distal opening 27, to prevent relative rotation and radial separation of the screw tower body 22 with respect to the tulip 40. In a spinal fixation procedure, the tulip 40 may first be secured to a spinal structure 16 (e.g., a vertebra) with a pedicle screw 12. For example, the pedicle screw 12 in this example passes through the tulip 40. The tulip 40 is held firmly in place between the spinal structure 16 and the tightened screw head 15. The tulip 40 serves as an anchoring feature for the screw tower 20. The tulip 40 is shaped for being received into the distal opening 27 of the screw tower body 22. In response to receiving the tulip 40 into the distal opening 27, the tulip 40 will engage the tulip retaining clips 30 to flex the retaining clips 30 outwardly and allow the retaining clips 30 to capture and secure the tulip 40 within the distal opening 27. In this example, more particularly, the tulip 40 includes a dovetail feature 42 that cooperates with the retention features of the tulip retaining clips 30 to automatically, lockingly engage the tulip 40 to the screw tower body 22 in response to receiving the tulip 40 at the distal opening 27 of the screw tower body 22.

Figure 6:
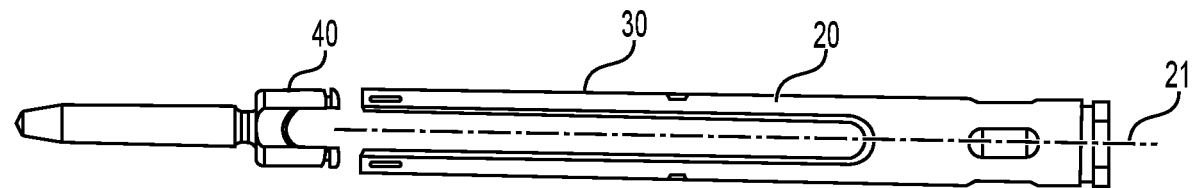
FIG. 6 is a side view of the screw tower aligned for connecting to the tulip 40 in an axial direction along the central axis.
Figure 7:
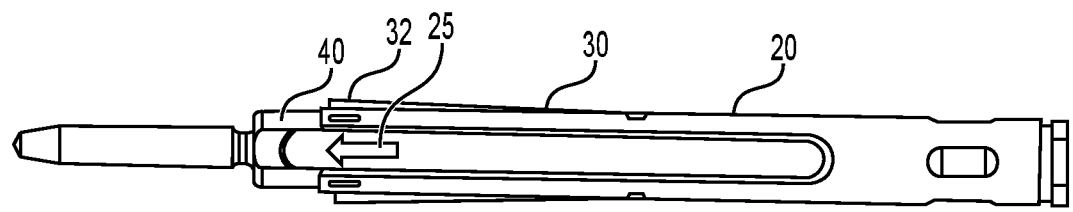
FIG. 7 is a side view of the screw tower as it is moved axially to begin receiving the tulip.
Figure 8:
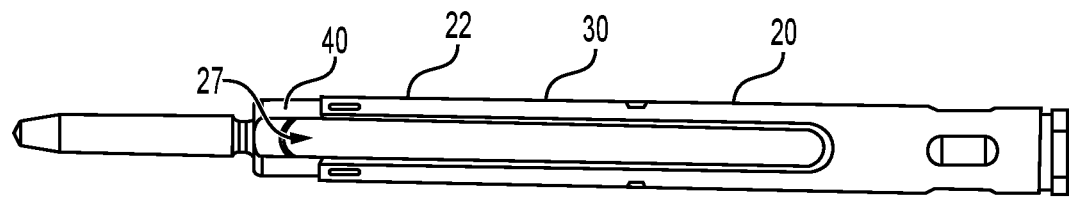
FIG. 8 is a side view of the screw tower with the tulip now received and fully seated within the distal opening of the screw tower body.

FIGS. 6-8 are a sequence of side views showing how the screw tower 20 may be easily coupled to the tulip 40 using the flexible tulip retaining clips. FIG. 6 is a side view of the screw tower 20 aligned for connecting to the tulip 40 in an axial direction along the central axis 21. FIG. 7 is a side view of the screw tower 20 as it is moved axially (directional arrow 25) to begin receiving the tulip 40. The tulip retaining clips 30 flex, allowing the free ends 32 to move radially outwardly slightly to accommodate the tulip 40. FIG. 8 is a side view of the screw tower 20 with the tulip 40 now received and fully seated within the distal opening 27 of the screw tower body 22. The free ends 32 have snapped backed into place about the tulip 40, releasably locking the screw tower body 22 onto the tulip 40.

Figure 9:
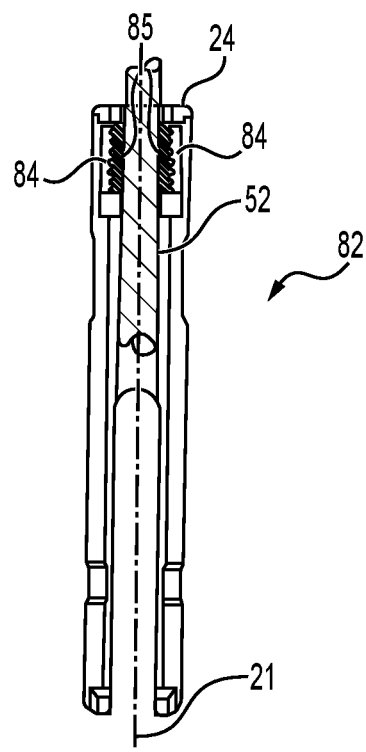
FIG. 9 is a sectional side view of a representative example configuration a driver body for driving rotation of a drive shaft assembly.

FIG. 9 is a sectional side view of a representative example configuration a driver body 82 for driving rotation of a drive shaft assembly (see, e.g., FIG. 1). A portion of a representative drive shaft 52 is drawn for discussion purposes in FIGS. 9 and 10. In one example, the driver body 82 may represent a portion of a screw tower, such as a modification to the screw tower body of FIGS. 2 and 3. In another example, the driver body 82 may be the body of a separate driver to be releasably coupled to a proximal end of a separate screw tower body, such as the screw tower body of FIGS. 2 and 3. The driver body 82 includes first and second threaded members 84 (e.g., half-nuts) each having an inwardly facing threaded portion 85 for threadedly engaging the outwardly threaded portion of a threaded drive shaft 52. Relative rotation between the driver body 82 and the drive shaft 52 about the axis 21 while the threaded members 84 are engaged with the drive shaft 52 will axially advance the drive shaft 52, and may also bias the threaded members 84 into engagement with the drive shaft 52 as further discussed below.

Figure 10:
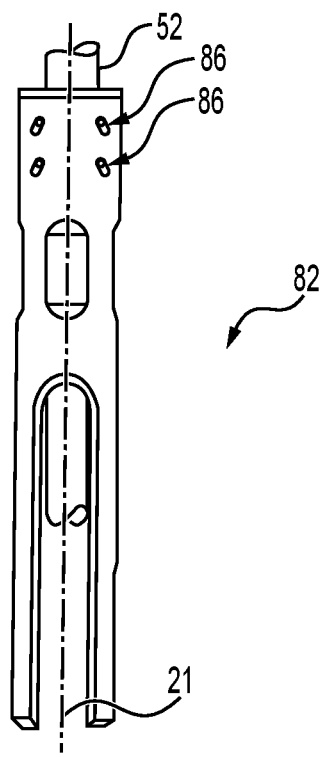
FIG. 10 is a side view of the driver body rotated ninety degrees about the central axis from its position in FIG. 9.

FIG. 10 is a side view of the driver body 82 rotated ninety degrees about the central axis 21 from its position in FIG. 9. The threaded members 84 (FIG. 9) ride on ramped portions 86 to engage and disengage the drive shaft 52. More particularly, in this example, the ramped portions 86 are embodied as slots, with each threaded member disposed in the driver body including at least one pin for riding in a respective one of the one or more slots. Alternatively, ramped portions could be embodied other ways such as an internal surface of the driver body 82 that radially tapers in an axial direction. In response to rotation of the drive shaft 52 in one rotational direction, or axial force applied to the drive shaft in the proximal direction, the ramped portions 86 on the driver body 82 guide the threaded members 84 proximately and radially inwardly to an engaged position with the threaded portion of the drive shaft. The rotational direction that drives the drive shaft 52 in a distal direction also urges the threaded members 84 to the engaged position in this example. In response to rotation of the drive shaft 52 in an opposite rotational direction, or axial load applied in the distal direction, the ramped portions on the driver body guide the threaded members 84 distally and radially outwardly to a disengaged position from the threaded portion of the drive shaft 52.

Figure 11:
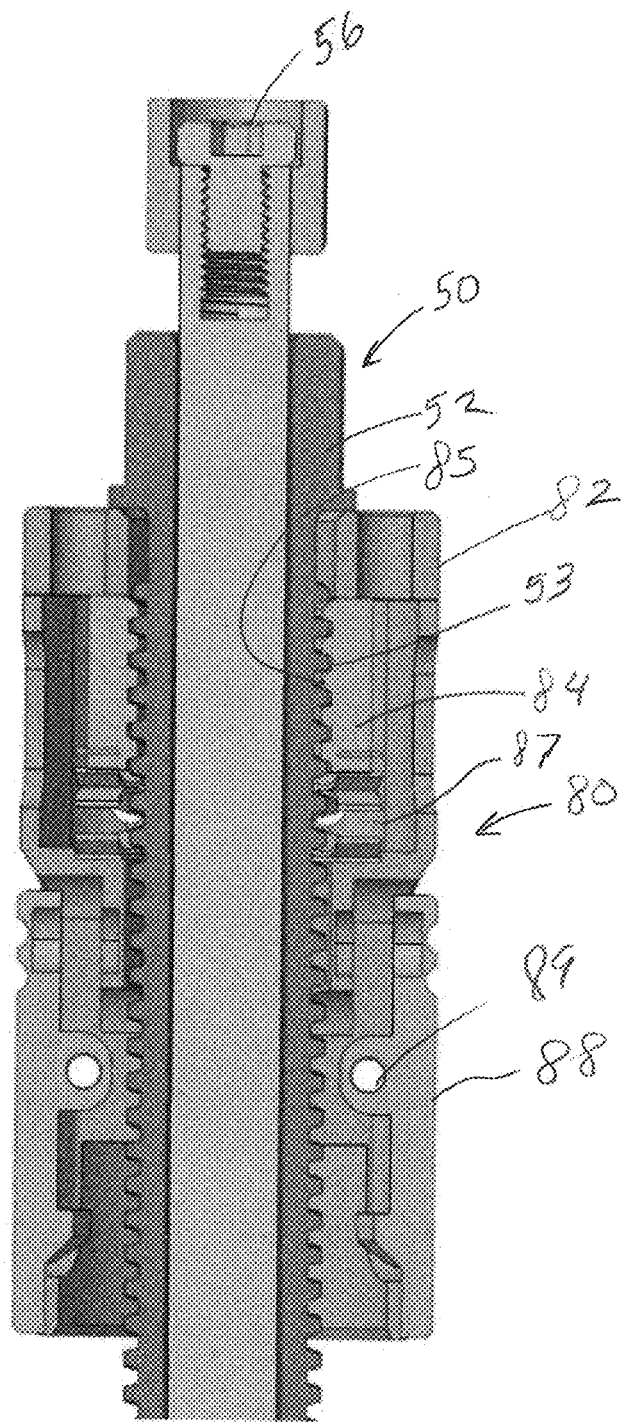
FIG. 11 is a sectional side view of a driver with a driver body incorporating various features discussed in relation to the example of FIGS. 6 and 7.

FIG. 11 is a sectional side view of a driver 80 with a driver body 82 incorporating various features discussed in relation to the example of FIGS. 6 and 7. An upper portion of the drive shaft assembly 50 is included in the drawing for reference, with the driver body 82 positioned thereon. The drive shaft assembly 50 includes the threaded drive shaft 52, which has an outwardly threaded portion 53 threadedly received within the internally threaded portion 85 of the opposing threaded members 84. A retaining screw 56 is provided at the upper end. A biasing member 87, which comprises a spring in this example, biases the threaded members 84 to the engaged position, in which the outwardly threaded portion 53 of the drive shaft 52 threadedly engages the internally threaded portion 85 of the threaded members 84. The driver body 82 in this example may be releasably coupled to another component, such as a screw tower body with one or more driver body retention clips 88. A driver body could be configured with any number of driver body retention clips, including as few as one driver body retention clip, but in this example includes two, opposing driver body retention clips 88. The driver body retention clips 88 are pivotable around a pivot 89 in this example, but alternatively could comprise flexible members similar to the tulip retaining clips discussed above. The driver body retention clips 88 may be biased to a locking position so that the driver body 82 can be snapped into place on a screw tower body.

Figure 12:
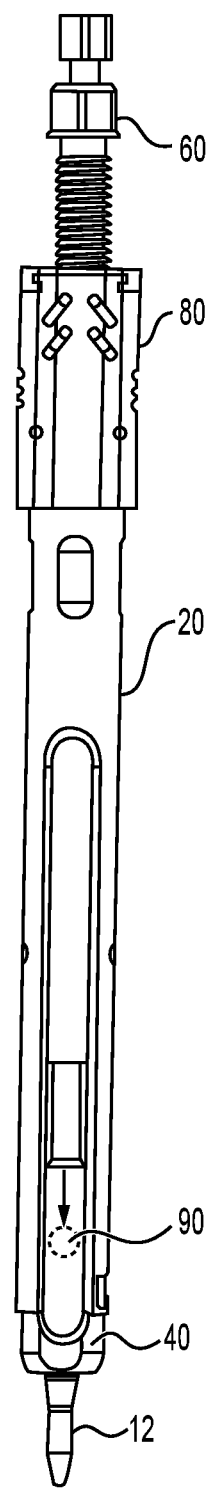
FIG. 12 presents a side view of the full system for performing a spinal fixation procedure.

Having discussed various system components in various example configurations, FIG. 12 presents a side view of the full system 10 for performing a spinal fixation procedure. In this view, the driver body 80 of FIG. 11 has been releasably coupled to the screw tower 20 of FIGS. 2 and 3, with the drive shaft assembly 50 concentrically disposed therein. The screw tower 20 has been releasably coupled to the tulip, which may be secured to a spinal structure (e.g., a pedicle) with the pedicle screw 12. The elongate rod channel 29 has space between a lower end of the drive shaft assembly 50 and the tulip 40 so that a rod or other spinal fixation member schematically indicated at 90 may be position in the elongate rod channel 29 (e.g., into the page in FIG. 12). By rotating the drive shaft assembly 50 with a top nut 60, a rod, locking cap, or other spinal fixation member disposed in the elongate rod channel 29 may be advanced axially in a direction of the central axis 21. Thus, the system 10 may be used in spinal fixation procedures, such as for the steps of securing a locking screw to the tulip 40 or seating (reducing) a rod in the tulip 40.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Various advantages of the present disclosure have been described herein, but embodiments may provide some, all, or none of such advantages, or may provide other advantages.

What is claimed is:

1. A screw tower for a spinal fixation procedure, comprising:
   a screw tower body defining a central axis and including a proximal end, a distal end with a distal opening sized for receiving a tulip, and rigid, axially extending first and second walls defining an elongate rod channel therebetween sized for receiving a spinal fixation rod to extend transversely through the screw tower body between the first and second walls; and
   one or more tulip retaining clips each coupled to the screw tower body and having a free end adjacent the distal end of the screw tower body, whereby each tulip retaining clip is radially flexible with respect to the first and second walls in response to receiving a tulip at the distal opening, the one or more tulip retaining clips including retention features that retain the received tulip,
   wherein opposing first and second threaded members disposed in the proximal end of the screw tower body, each threaded member having an inwardly facing threaded portion for threadedly engaging an outwardly threaded portion of a drive shaft received in the screw tower body, wherein each threaded member rides on a corresponding ramped portion extending transversely to the central axis to guide the threaded members proximately and radially inwardly toward an engaged position and distally and radially outwardly toward a disengaged position.

2. The screw tower of claim 1, wherein the one or more tulip retaining clips comprise a plurality of the tulip retaining clips circumferentially spaced about the central axis.

3. The screw tower of claim 2, wherein the plurality of the tulip retaining clips comprise a first tulip retaining clip coupled to the first wall with the free end extending through an aperture in the first wall and an opposing second tulip retaining clip coupled to the second wall with the free end extending through an aperture in the second wall.

4. The screw tower of claim 1, further comprising:
   a plurality of circumferentially spaced flat sections along the proximal end of the screw tower body for receiving a counter-torque instrument.

5. The screw tower of claim 1, further comprising:
   a tulip shaped for fastening by a pedicle screw and for being received at the distal opening of the screw tower body, the tulip including a dovetail feature, wherein the dovetail feature and the retention features of the tulip retaining clips cooperate to automatically lockingly engage the tulip to the screw tower body in response to receiving the tulip at the distal opening of the screw tower body.

6. The screw tower of claim 1, further comprising:
   at least one of an anti-rotation feature and an anti-splay feature on the distal end of the screw tower body and one or more corresponding anti-rotation or anti-splay features on the tulip that are respectively engaged in response to receiving the tulip into the distal opening to prevent relative rotation and radial detachment of the screw tower body with respect to the tulip.

* * * * *